April 18, 1961 J. M. BENSON 2,980,432
FLUID OPERATED CHUCK
Filed Aug. 10, 1959 3 Sheets-Sheet 1
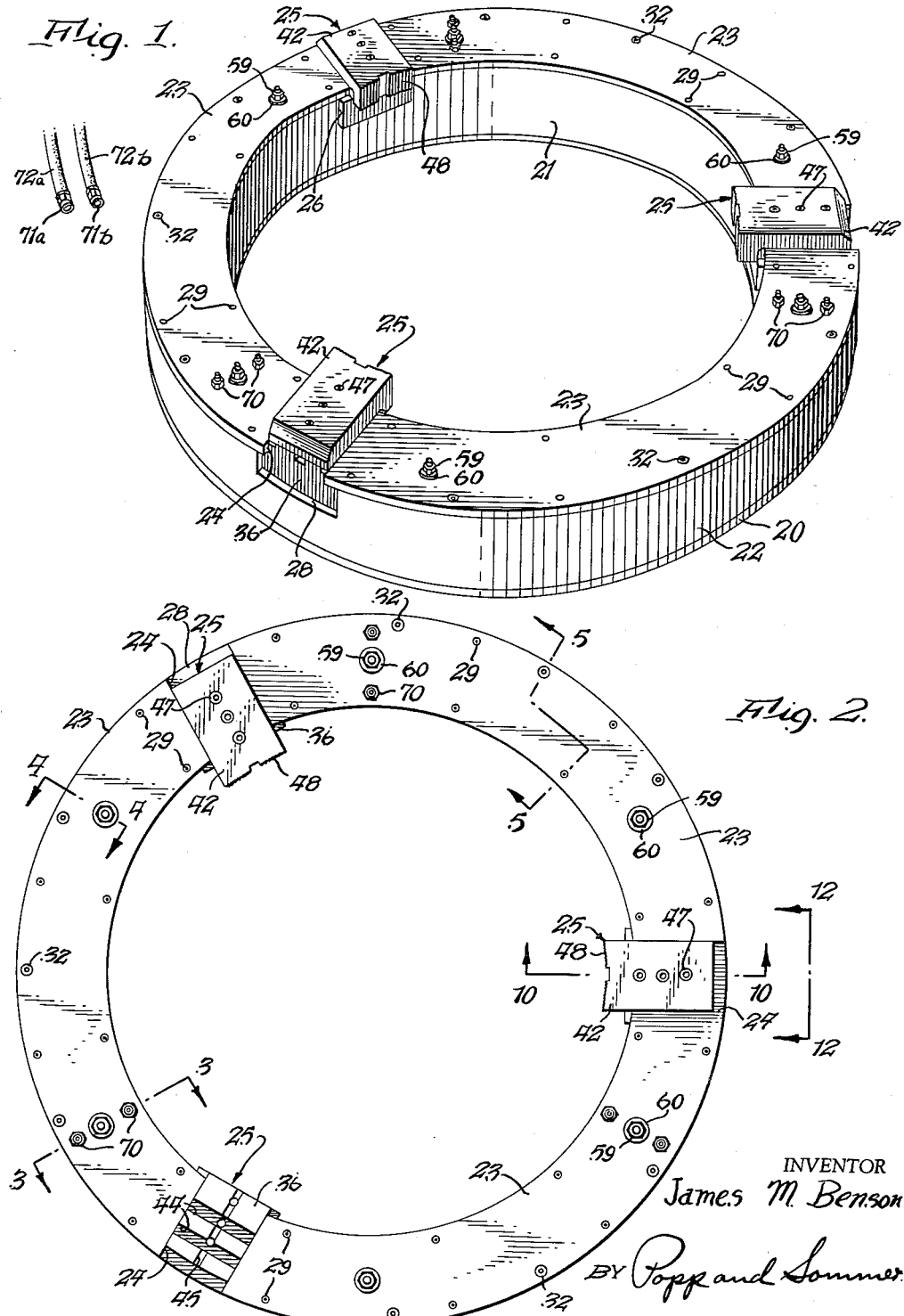

April 18, 1961 J. M. BENSON 2,980,432
FLUID OPERATED CHUCK
Filed Aug. 10, 1959 3 Sheets-Sheet 2
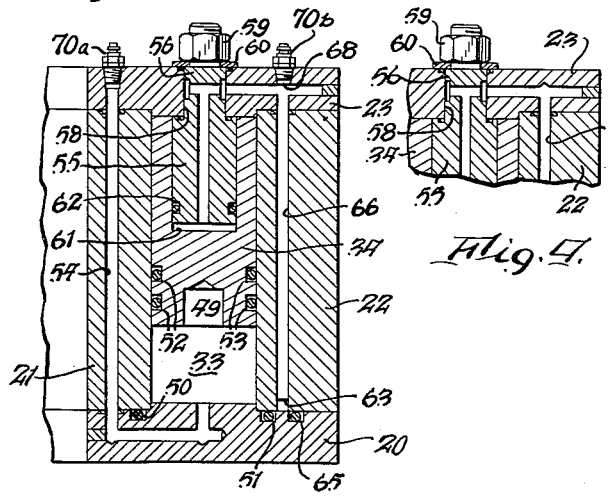
Fig. 3.
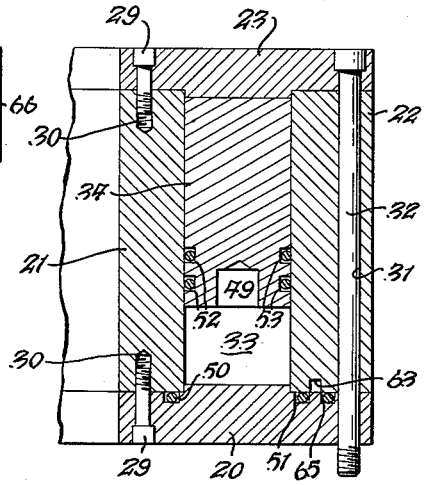
Fig. 4.
Fig. 5.
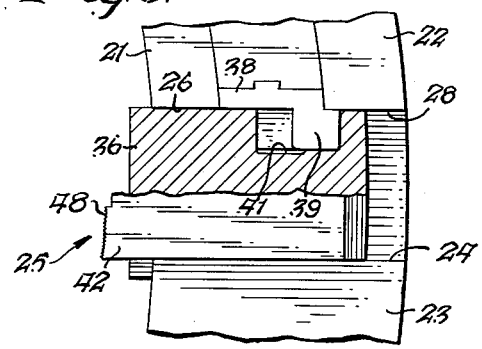
Fig. 6.
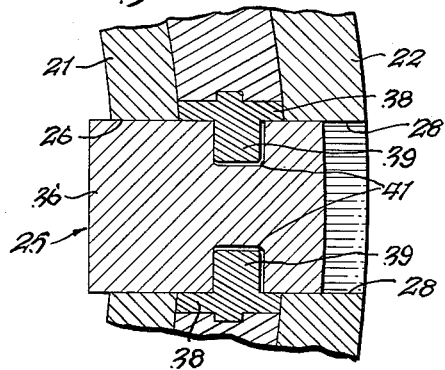
Fig. 7.
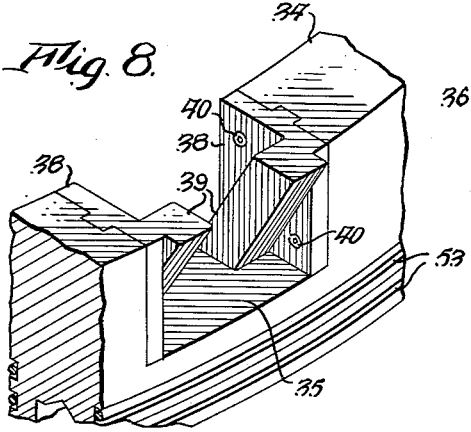
Fig. 8.
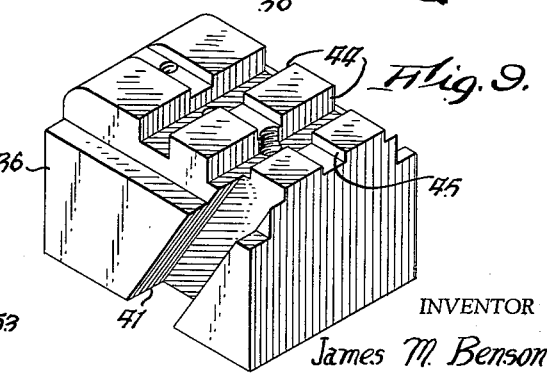
Fig. 9.
INVENTOR
James M. Benson
BY Popp and Sommer
ATTORNEY April 18, 1961  J. M. BENSON  2,980,432
FLUID OPERATED CHUCK
Filed Aug. 10, 1959  3 Sheets-Sheet 3

INVENTOR
James M. Benson
BY Popp and Sommer
ATTORNEY

United States Patent Office 2,980,432
Patented Apr. 18, 1961

2,980,432

FLUID OPERATED CHUCK

James M. Benson, Buffalo, N.Y., assignor to Mollenberg-Betz Machine Company, Buffalo, N.Y., a corporation of New York Filed Aug. 10, 1959, Ser. No. 832,742

4 Claims. (Cl. 279—4)

This invention relates to an improved fluid operated chuck, and more particularly to a chuck which is operated by compressed air.

As is well known, a chuck is a fixture for machinery or machine tools adapted to hold a workpiece while it is being worked upon or machined. Fluid operated or pneumatic chucks, other than that disclosed herein, are known but they have undesirable features, chief among which is that mechanism for moving the jaws of the chuck is centrally arranged and prevents the workpiece, particularly an elongated one, from extending through the chuck and therefore the workpiece can only be held at its end. This limits the range of use of such a prior art chuck.

It is accordingly an important object of the present invention to provide a fluid operated chuck which is annular in form and free of obstruction at its center so that a workpiece can extend through the open center and can be completely surrounded by the chuck.

Another important object is to provide such a chuck which is wholly contained within its annular body and does not have external cylinders or draw rods such as prior chucks of this type had.

A further object is to provide such a chuck which has an annular body capable of an exceptionally large inside diameter, for the full axial length of the body, in relation to its outside diameter.

Another object is to provide such a chuck which does not require permanently affixed pipes or tubes for supplying pressurized fluid for operating the jaws of the chuck.

Still another object is to provide such a chuck which, because of its self-contained design and lacking permanent fluid supply connections, can be allowed to rotate, move axially, or travel in any manner with another machine on which it is suitably mounted depending upon the use application of the chuck intended and desired, thereby providing a chuck which is outstandingly flexible in use and adaptable for many applications.

Another aim of the invention is to provide such a chuck which is simple in construction and not likely to get out of order or require repairs.

Other objects and advantages of the invention will be apparent from the following detailed description and accompanying drawings in which:

Fig. 1 is a perspective view of a fluid operated chuck constructed in accordance with the present invention, suggestive of the horizontal position of the chuck if it were arranged on the rotating table of a vertical boring mill, for example, such table not being illustrated in the figure, and also showing fluid handling hoses separate from but in juxtaposition to the chuck.

Fig. 2 is a top plan view of the chuck shown in Fig. 1 and showing the jaws thereof in an inner or closed position.

Fig. 3 is an enlarged sectional view thereof taken on line 3—3 of Fig. 2.

Fig. 4 is a similar but fragmentary sectional view thereof and taken on line 4—4 of Fig. 2.

Fig. 5 is a similar sectional view thereof and taken on line 5—5 of Fig. 2.

Fig. 6 is a fragmentary top plan view of portion of the chuck shown in Fig. 2 and showing one of the jaws with a portion broken away to reveal hidden structure.

Fig. 7 is a view thereof similar to Fig. 6 but a full section and taken on line 7—7 of Fig. 10.

Fig. 8 is a perspective fragmentary view of a portion of the annular piston member forming an element of the chuck and showing the male elements of an inclined plane cam means operatively interposed between the piston member and each of the jaws.

Fig. 9 is a perspective view of one of the chuck jaws and showing the female elements of the aforesaid inclined plane cam means.

Figure 10:
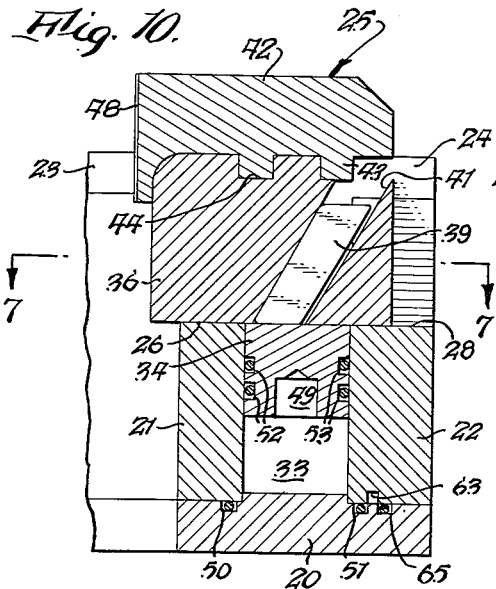
Fig. 10 is a transverse sectional view of the chuck radially through one of the jaws thereof and taken on line 10—10 of Fig. 2, and showing the jaw in an inner or closed position.

While a fluid operated chuck embodying the principles of the present invention may be variously constructed depending in part upon its size and intended environment of use, that shown in the drawings is representative and illustrative of a chuck arranged in a horizontal position such as would be the case if it were supported on a rotating table of a vertical boring mill (not shown).

The inventive chuck is shown as having an annular hollow body including a back plate 20 of annular outline, a pair of spaced inner and outer concentric cylindrical rings 21 and 22, respectively, and a series of sector shaped or split front plates 23. Three such front plates 23 of similar circumferential extent are shown. The opposing and radially extending ends 24 of each adjacent pair of front plates 23 are spaced apart to provide a way for a jaw indicated generally at 25. Three such jaws 25 at equidistant circumferential intervals are shown although any number may be employed. The inner and outer rings 21 and 22 at the locations of the jaws 25 are provided with cut-outs or openings 26 and 28, respectively, to accommodate radial movement of the jaws.

The various plates 20 and 23 are secured to the rings 21 and 22 in any suitable manner, such as by recessed screws 29. These screws 29 are shown as arranged at uniformly spaced intervals in two annular rows adjacent the inner and outer margins of the chuck body, as best shown in Fig. 2. The screws 29 extend axially of the chuck body so as to have their threaded shanks received in threaded recesses 30 provided in the rings 21 and 22, as best shown in Fig. 5.

In order to secure the chuck to the machine tool table (not shown), the chuck body as shown may be provided with through holes 31 extending axially through the front plates 23, outer ring 22 and back plate 20 to receive hold down bolts 32, as shown in Fig. 5. The companion sets of holes 31 and bolts 32 are shown as spaced circumferentially around the chuck body adjacent the outer periphery thereof. Instead they may be arranged adjacent the inner periphery of the chuck body, or adjacent both peripheries, if desired.

The hollow interior of the chuck body formed jointly by the plates 20, 23 and rings 21, 22 provides an annular chamber 33. Within this chamber 33 is arranged an annular piston member 34. The axial length of this piston member 34 is less than that of the chamber 33 so that the piston member is capable of sliding movement within this chamber in a direction axially of the chuck body.

Cam means are operatively interposed between the piston member 34 and each of the jaws 25. Such cam means are arranged to move the jaws radially upon movement of the piston member axially. While such cam means may be variously constructed, the same are preferably of an inclined plane nature as shown in detail in Figs. 6 through 11.

Referring to Fig. 8, the annular piston member 34 is shown as provided with a U-shaped notch or recess 35 to accommodate the bottom jaw 36 as shown in Fig. 9. The vertical and opposing ends of the notched piston member 34 are severally shown as faced with a cam member 38 formed with an inclined outwardly projecting rib or male cam element 39. The base plate of the cam member 38 is suitably secured to the piston member 34 as by screws 40. The ribs or male cam elements 39 are severally received in inclined grooves 41 provided on opposite sides of the bottom jaw 36 as shown in Fig. 9.

Figure 11:
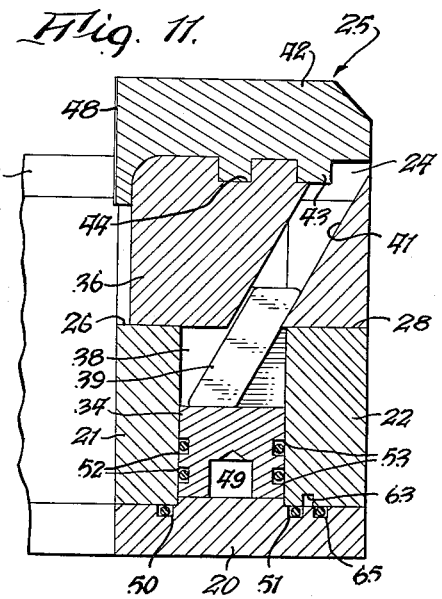
Fig. 11 is a sectional view thereof similar to Fig. 10 but showing the jaw in an outer or open position.

As best shown in Figs. 10 and 11, when the piston member 34 is raised or moved away from the back plate 20 toward the front plates 23 the male and female cam elements 39 and 41, respectively, cooperate to move the bottom jaw 36 and the top jaw 42 which is suitably secured thereto radially inwardly of the chuck body, or to the left as viewed in Fig. 10. The bottom jaw 36 and top jaw 42 jointly provide one of the jaws designated 25 elsewhere herein. Preferably, these two jaw members are mechanically interlocked by transverse ribs 43 on the top jaw 42 received in grooves 44 provided in the upper face of the bottom jaw 36. A longitudinal groove 45 in the upper surface of the bottom jaw receives a correspondingly arranged rib 46 provided in the lower surface of the top jaw. The bottom and top jaws 36 and 42, respectively, are held together by a number of vertically extending screws 47, three such screws being provided for each jaw 25 as shown in Figs. 1 and 2.

Referring to Fig. 11, when the piston member 34 is moved downwardly or away from the front plates 23 toward the back plate 20, the male and female elements 39 and 41, respectively, cooperate to retract or move the jaw 25 radially outwardly to its outermost position.

In short, when the jaw 25 is in the position shown in Fig. 10, and the other jaws of the chuck are in a similar position, the chuck is closed since the jaws are moved radially inwardly toward each other to frictionally engage a workpiece interposed therebetween. However, when the jaws 25 are in their outer position, as one is represented in Fig. 11, the chuck is in an open condition. In order to increase the holding power of the jaws, the inner ends of the top jaw 42 of each is shown as provided with serrations or knurling as indicated at 48.

Means are provided to apply pressurized fluid to one side of the piston member 34 while allowing fluid to escape or exhaust from the opposite side of this piston member. In this manner, the piston member 34 can be moved to cause the jaws of the chuck to move in or out and hence open or close the chuck, to release or grip the workpiece. Such means are also selectively operated.

As shown the end of the annular piston member 34 adjacent the back plate 20 is provided with an annular groove 49. Referring to Fig. 11, this groove 49 jointly with the inner face of the back plate 20 provides an annular space between the chuck body and piston member 34 on one side of the latter. In order to seal against the escape of pressurized fluid from the space 49 as shown in Fig. 11, or from this space jointly with a portion of the chamber 33 communicating therewith as shown in Fig. 10, the back plate 20 is shown as provided with inner and outer annular grooves 50 and 51, respectively, each of which receives a continuous O-ring which bears against the opposing face of the inner ring 21 in the case of the O-ring for the groove 50 and against the inner face of the outer ring 22 in the case of the O-ring for the outer groove 51.

As well, the piston member 34 is provided with two axially spaced annular grooves 52 on its inner peripheral face and a similar pair of grooves 53 on its outer peripheral face, such grooves 52 and 53 being arranged adjacent that end of the piston member 34 provided with the annular groove 49. Each of the sealing grooves 52 and 53 receives a continuous O-ring which engages slidingly the opposing surface of the inner and outer rings 21 and 22, respectively.

Means within the chuck body provide a passage leading from the exterior of the body to the annular space 49. Such passage means are shown in Fig. 3 and are represented by the numeral 54. Specifically, the passage 54 leading from the outer face of the front plate 23 extends through the inner ring 21 and thence laterally through part of the back plate 20 and thence axially into communication with the rear end of the chamber 33 with which the annular groove 49 is also in communication.

It will thus be seen that if fluid under pressure is introduced into the passage 54 and assuming the piston member 34 to be initially in the position shown in Fig. 11, such pressurized fluid is operative to move the piston member 34 to the position shown in Fig. 10. A check valve is arranged in the passage 54 and when seated is operative to prevent the outflow of fluid from the passage 54 as will be explained in greater detail later herein.

While various means may be provided for moving the piston in the opposite direction from that just described, such means as shown preferably comprises a series of recess and plunger means operatively arranged between the chuck body and the annular piston member 34. One such means is shown in Fig. 3 and includes a cylindrical plunger 55 rigidly mounted in any suitable manner on one of the front plates 23. As shown, the outer end of the plunger 55 has a reduced neck 56 which extends through a hole 58 provided in the front plate 23. The outer extremity of the neck 56 is externally threaded to receive a nut 59. A seal washer 60 is shown as interposed between the nut 59 and the upper face of the front plate 23. The inner and larger cylindrical portion of the plunger 55 is slidably received in a cylindrical recess 61 provided in the annular piston member 34 and extending inwardly from that face thereof opposite from the annular groove 49. In order to provide a substantially leak-proof seal between the recess 61 and plunger 55, the latter is shown as provided with an annular groove 62 adjacent its inner end which receives a continuous O-ring engaging the cylindrical wall of the recess 61.

A plurality of such recess and plunger means are provided at circumferentially spaced intervals about the chuck. As shown in Figs. 1 and 2, six such recess and plunger means are provided at equidistant circumferential intervals, although any suitable number of such means may be employed.

Passage means in the chuck body are provided for supplying an exhausting fluid to and from the portion of each recess 61 unoccupied by its plunger 55. As shown in Fig. 3, such means include an annular groove 63 provided in the end face of the outer ring 22 which engages the inner face of the back plate 20. This groove is sealed on opposite sides by a pair of radially spaced continuous O-rings arranged severally in inner and outer annular grooves 51 and 65, respectively, provided in the adjacent face of the back plate 20. Communicating with the annular space provided by the groove 63 is a passage 66 which extends axially therefrom through the outer ring 22, thence laterally through the top plate 23 and into the neck 56, and thence axially through the plunger 55, thus opening at its opposite end into communication with the recess 61. For alternate ones of the six recess and plunger means, a branch passage 68 leads from the outer face of the front plate 23 to an intermediate portion of the corresponding passage 66. A check valve is shown as arranged in the branch passage 68 and this check valve is operative when seated to prevent the outflow of fluid from the passage 66 as more fully described hereinafter.

It will be seen that if pressurized fluid is introduced into the passages 66 so that it can flow into the recesses 61, this fluid will be operative to move the piston member 34 away from the stationary plungers 55. In other words, by introducing pressurized fluid into the recesses 61, the piston member 34 can be moved from the position shown in Fig. 3 or 10 to the position shown in Fig. 11.

Figure 13:
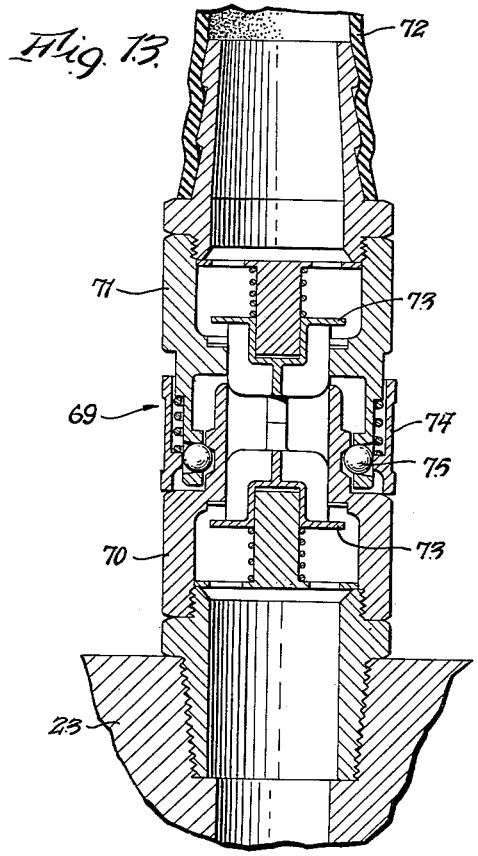
Fig. 13 is a longitudinal sectional view through one of the coupling elements mounted on the chuck body as shown in Fig. 3 and illustrated in operative association with the cooperative coupling element on the end of a fluid handling hose.
Figure 12:
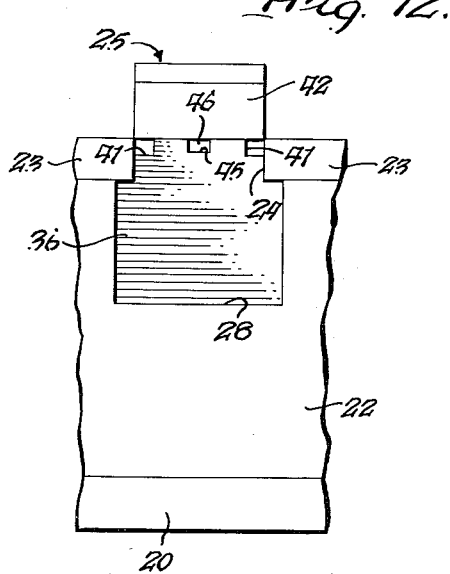
Fig. 12 is a fragmentary elevational view of the chuck and taken on line 12—12 of Fig. 2 and showing the outer end of one of the chuck jaws.

It is preferred to employ a commercially available type of coupler 69 as shown in Fig. 13 for connecting alternatively and selectively the chambers 49 and 61 on opposite sides of the piston member 34 to pressurized fluid supply and exhaust lines, such as tubes, pipes or hoses. Each such coupler 69 is shown as including a male element 70 and a cooperating but separable female element 71. Preferably the male element 70 is arranged at one end of each passage 54 and and the end of each branch passage 68. The female coupling element 71 is shown in Fig. 13 as connected to a hose 72. Such a coupler is characterized by having a normally seated but unseatable check valve 73 provided in each of its cooperating elements 70 and 71. The elements 70 and 71 are separable by retracting a sleeve 74 carried by the female element 71. This permits a series of locking balls 75 to release an interlock between parts of the two elements. When the coupling elements 70 and 71 are joined together as shown in Fig. 13, the opposing ends of the stems of the check valves 73 abut and lift the heads of these valves off their seats, thereby establishing communication between the passages provided in the two elements. However, when the coupling elements 70 and 71 are disconnected or separated, the valve stems separate and the valves being biased toward their seats are permitted to seat and thereby close each element 70 or 71 against outflow therefrom. Thus each coupler 69 has built-in check valves operative when seated to hold fluid in the hose and fluid in the chuck, but when unseated allows communication between the hose and chuck.

Referring to Fig. 1, it will be seen that a pair of hoses 72a and 72b (each corresponding to hose 72 in Fig. 13) each having at one end a female coupling element 71a or 71b, respectively (each corresponding to element 71 in Fig. 13), is arranged adjacent to the chuck although not permanently connected thereto or mounted thereon. One hose, such as 72a, is a hose connected to a source (not shown) of compressed air maintained at, say, 100 p.s.i. The other hose 72b is unconnected to anything but atmosphere at the end remote from the female coupling element 71b and serves as an exhaust line. The hoses 72a and 72b may be connected alternatively and selectively to a pair of radially spaced male coupling elements 70a and 70b (each corresponding to the element 70 in Fig. 13) which are arranged on the outer face of the front plates 23. Referring to Fig. 1, three such pairs of male coupling elements 70a and 70b are shown, although any number may be employed. The elements 70a are arranged in an inner circle and the elements 70b lie in an outer circle.

It will thus be seen that if the pressure line 72a through its female coupling element 71a is connected to the male coupling element 70a and at the same time the exhaust line 72b through its female coupling element 71b is connected to the male coupling element 70b, the check valves arranged operatively within the passages 54 and 66 will be unseated and pressurized fluid will be allowed to pass into the annular space 49 between the piston member 34 and the chuck body. At the same time fluid occupying the recess 61 will be allowed to escape through the passage 66 and branch passage 68 into the exhaust line 72b. This selective manner of connecting the hoses 72a and 72b with the passages 54 and 66, respectively, will, therefore, move the piston member 34 from the position shown in Fig. 11 to the position shown in Figs. 10, 3 and 5 and thereby move the jaws from an outward inoperative radial position to an inward operative radial position. In other words, the chuck is closed.

If, on the other hand, the pressure line 72a through its female coupling element 71a is connected to the male coupling element 70b while the exhaust line 72b through its female coupling element 71b is connected to the male coupling element 70a, pressurized fluid is allowed to enter through the passages 68 and 66 into each recess 61. At the same time, fluid can be displaced from the space 49 and unoccupied portion of the chamber 43 through the passage 54 into the exhaust line 72b. Such a hook-up will, therefore, permit the piston to be moved from the position shown in Figs. 3, 5 and 10 to that shown in Fig. 11 and thereby move the jaws from a radially inward position to a radially outward position. In other words, the chuck is opened.

Referring to Figs. 1 and 2, it will be seen that six plungers 55 are arranged at circumferentially spaced intervals around the chuck with three of such plungers having severally a pair of male coupling elements 70a and 70b arranged radially on opposite sides thereof. The three remaining plungers 55 unprovided with adjacently disposed coupling elements are constructed as individually shown in Fig. 4. The only difference between the construction shown in Fig. 4 and that shown in Fig. 3 is the elimination of the branch passage 68 and the male coupling element 70b shown in Fig. 3.

The annular passage 63 serves as an annular manifold chamber to which each of the recesses 61 is connected by its passage 66. The male coupling elements 70b connected to alternate passages 66 are merely conveniently arranged locations about the circumference of the chuck at which the pressure line 72a or exhaust line 72b may be connected to the chuck to service the recess and plunger means on one side of the piston 34.

Likewise, the passages 54 are provided only to connect each male coupling element 70a with the annular space 49, this space serving also as a manifold chamber servicing all of the several passages 54.

It will therefore be seen that a chuck constructed in accordance with the principles of the present invention accomplishes all of the stated objects. Such a chuck is further characterized by providing an amount of radial travel for the various jaws in excess of that which can be achieved by other known types of pneumatic chucks.

It will be readily apparent to those skilled in the art that instead of arranging the male coupling element 70a and 70b on the front plates 23, these elements can be placed elsewhere, if desired, such as on an outer ring 22 or on the back plate 20.

Also, it will be apparent to those skilled in the art that the chuck can be supported on a suitable carrier which might be attached to the back plate 20 for supporting the chuck in a vertical position, should this be desired for a particular application.

As well, jaws may be arranged on the chuck body to move radially outwardly beyond the outer periphery of the body to engage a tubular workpiece, with or without a set of jaws arranged to move radially inwardly as shown.

While the fluid for operating the chuck is preferably compressed air because of its ready availability around a shop where a chuck would be used, it is apparent that any other suitable compressed gas or pressurized liquid might be used.

Accordingly, the specific embodiment disclosed is intended to be illustrative and not limitative of the invention, the scope of which is to be measured by the appended claims.

What is claimed is:

1. A fluid operated chuck, comprising a body having a chamber, a piston member reciprocably arranged in said chamber, spaced jaws arranged on said body for movement transversely of said piston member, cam means operatively interposed between said piston member and jaws and arranged to move said jaws in a direction transverse to the direction of movement of said piston member, recess and plunger means operatively arranged between said body and piston member for moving said piston member in one direction, and means arranged alternatively and selectively to introduce pressurized fluid into said chamber between said body and piston member to move the latter in a direction opposite from said one direction while allowing fluid to exhaust from said recess and plunger means, whereby said piston member and hence said jaws can be moved in the direction desired.

2. A fluid operated chuck, comprising a body having a chamber, a piston member reciprocably arranged in said chamber, spaced jaws arranged on said body for movement transversely of said piston member, cam means operatively interposed between said piston member and jaws and arranged to move said jaws in a direction transverse to the direction of movement of said piston member, spaced stationary plungers arranged on said body and severally received slidably in recesses provided in said piston member, means providing a first passage leading from the exterior of said body to the space between said body and piston member on the side thereof opposite from said recesses, means providing a second passage leading from the exterior of said body to said recesses, and a check valve arranged in each of said passages and operative to prevent flow from the corresponding passage to the exterior of said body when the check valve is seated, whereby said piston member and hence said jaws can be moved in the direction desired by selectively and alternatively connecting one of said passages to a source of pressurized fluid while unseating the check valve in the other of said passages.

3. A fluid operated chuck, comprising an annular hollow body having an annular chamber, an annular piston member reciprocably arranged in said chamber for movement in a direction axially of said body, circumferentially spaced jaws arranged on said body for movement in a direction radially thereof, cam means operatively interposed between said piston member and jaws and arranged to move said jaws in such radial direction upon movement of said piston member in such axial direction, circumferentially spaced stationary plungers arranged on said body and severally received slidably in recesses provided in said piston member, means providing a first annular space between said body and piston member on the side thereof opposite from said recesses, means providing a first passage leading from the exterior of said body to said first space, means providing a second annular space in said body, means providing a second passage leading from the exterior of said body to said second annular space, means providing communication through said plungers between said recesses and said second annular space, and a check valve arranged in each of said passages and operative to prevent flow from the corresponding passage to the exterior of said body when the check valve is seated, whereby said piston member and hence said jaws can be moved in the direction desired by selectively and alternatively connecting one of said passages to a source of pressurized fluid while unseating the check valve in the other of said passages.

4. A fluid operated chuck, comprising an annular hollow body having radially spaced inner and outer rings, a back plate and split front plates, the opposing ends of adjacent pairs of said front plates being spaced apart to provide a way, a radially movable jaw slidably arranged on said body in each of said ways, an annular piston member axially slidably arranged between said rings and provided at its rear end with an annular groove and at its front end with circumferentially spaced recesses, inclined plane cam means operatively interposed between said piston member and jaws and arranged to move said jaws radially upon movement of said piston member axially, circumferentially spaced plungers rigidly mounted on said front plates and severally received slidably in said recesses, first passage means in said body opening to the exterior thereof and communicating with said groove, means in said body providing an annular manifold chamber, means in said body establishing communication through each of said plungers between said recesses and said manifold chamber, second passage means in said body opening to the exterior thereof and communicating with said manifold chamber, and a coupling element at the outer end of each of said passage means and including a check valve which when seated is operative to prevent flow from the corresponding passage to the exterior of said body, whereby said coupling elements are adapted alternatively and selectively to be connected to cooperating coupling elements on hoses one of which is connected to a source of pressurized fluid and the other of which is an exhaust line so that said jaws can be opened or closed as desired merely by reversing the hose connections.

References Cited in the file of this patent
UNITED STATES PATENTS

| 2,597,280 | Barnes | May 20, 1952 |
| 2,736,563 | Work | Feb. 28, 1956 |
| 2,915,316 | Ernest | Dec. 1, 1959 |